United States Patent
Suzuki (10) Patent No.: US 10,293,282 B2
(45) Date of Patent: *May 21, 2019

(54) MESH FILTER (71) Applicant: Enplas Corporation, Saitama (JP)

(72) Inventor: Akihiro Suzuki, Saitama (JP)

(73) Assignee: Enplas Corporation, Saitama (JP)

( * ) Notice: Subject to any disclaimer, the term of this patent is extended or adjusted under 35 U.S.C. 154(b) by 98 days.

This patent is subject to a terminal disclaimer.

(21) Appl. No.: 14/912,712

(22) PCT Filed: Jul. 14, 2014

(86) PCT No.: PCT/JP2014/068679
§ 371 (c)(1),
(2) Date: Feb. 18, 2016

(87) PCT Pub. No.: WO2015/025639
PCT Pub. Date: Feb. 26, 2015

(65) Prior Publication Data
US 2016/0199758 A1    Jul. 14, 2016

(30) Foreign Application Priority Data

Aug. 20, 2013   (JP) .................. 2013-170297
Sep. 4, 2013    (JP) .................. 2013-182879

(51) Int. Cl.
*B01D 29/11*    (2006.01)
*B29C 45/16*    (2006.01)
(Continued)

(52) U.S. Cl.
CPC ........... *B01D 29/11* (2013.01); *B01D 29/111* (2013.01); *B01D 39/083* (2013.01); *B29C 45/16* (2013.01);
(Continued)

(58) Field of Classification Search
CPC ..... B01D 29/11; B01D 29/111; B01D 39/083; B29C 45/14336; B29C 45/16;
(Continued)

(56) References Cited

U.S. PATENT DOCUMENTS 4,773,990 A * 9/1988 Hood, Jr. ............. B01D 29/072
                                                        210/314
4,911,840 A * 3/1990 Underwood .......... B01D 63/10
                                                        210/266
(Continued)

FOREIGN PATENT DOCUMENTS

DE  102004002963    *  1/2005
JP  58-122526          7/1983
(Continued)

OTHER PUBLICATIONS

JPH07284617—machine translation.*

(Continued)

*Primary Examiner* — Madeline Gonzalez
(74) *Attorney, Agent, or Firm* — Wenderoth, Lind & Ponack, L.L.P.

(57) ABSTRACT

A mesh filter includes a filter unit connecting an outer peripheral surface of an inner cylinder and an inner peripheral surface of an outer cylinder. The inner cylinder, the outer cylinder, and the filter unit are integrally molded by injecting a thermoplastic resin into a cavity of a mold so as to have a one-piece construction. A portion of the filter unit other than a connecting portion between the inner cylinder and the outer cylinder has square-shaped openings formed by vertical ribs formed equidistantly so as to be orthogonal to an X-axis and parallel to a Y-axis, and lateral ribs formed equidistantly so as to be orthogonal to the vertical ribs and parallel with the X-axis. The vertical ribs and the lateral ribs have rib widths (L2, L3) in a range from 0.07 to 0.1 mm and (Continued)

thicknesses (L4, L5) along a center axis of the inner cylinder in a range from 0.2 to 0.4 mm.

10 Claims, 6 Drawing Sheets

(51) Int. Cl.
- *B01D 39/08* (2006.01)
- *B29C 45/26* (2006.01)
- *F02M 37/22* (2019.01)
- *B29K 101/12* (2006.01)
- *B29L 31/14* (2006.01)
- *B29L 31/00* (2006.01)

(52) U.S. Cl.
CPC ......... *B29C 45/2628* (2013.01); *F02M 37/22* (2013.01); *B29K 2101/12* (2013.01); *B29L 2031/14* (2013.01); *B29L 2031/737* (2013.01)

(58) Field of Classification Search
CPC ...... B29C 2045/14442; B29K 2101/12; B29L 2031/14; B29L 2031/737
USPC ......... 210/400, 471, 438, DIG. 17, 162–166, 210/439, 437
See application file for complete search history.

(56) References Cited

U.S. PATENT DOCUMENTS

| | | | |
|---|---|---|---|
| 7,625,199 B2 * | 12/2009 | Jahn | .................... B29C 45/2628 210/499 |
| 2006/0049099 A1 * | 3/2006 | Chang | .................. B01D 29/055 210/472 |

FOREIGN PATENT DOCUMENTS

| | | |
|---|---|---|
| JP | 5-44204 | 6/1993 |
| JP | 7-137166 | 5/1995 |
| JP | H07284617 | * 10/1995 |
| JP | 7-323438 | 12/1995 |
| JP | 9-1690 | 1/1997 |
| JP | 2007-1232 | 1/2007 |

OTHER PUBLICATIONS

DE102004002963—machine translation.*
International Search Report dated Oct. 14, 2014 in corresponding International Application No. PCT/JP2014/068679 (with English translation).

* cited by examiner

MESH FILTER

BACKGROUND OF THE INVENTION

The present invention relates to a mesh filter used for filtering out foreign substances in a fluid and, specifically, to a mesh filter integrally molded by injection molding.

BACKGROUND ART

For example, a mesh filter is arranged at a midpoint of oil piping such as a fuel supply tube, a lubricating device, and the like to be connected to a fuel injection device of an automotive vehicle and foreign substances in fluid such as fuel or oil are filtered out with the mesh filter.

First Example of Related Art

FIG. 6 illustrates a mesh filter 100 of the related art. FIG. 6A is a plan view of the mesh filter 100 of the related art, and FIG. 6B is a cross-sectional view of the mesh filter 100 taken along line A4-A4 in FIG. 6A. FIG. 6C is a cross-sectional view of a mold 101 for explaining a first stage of a method of molding the mesh filter 100 of the related art, FIG. 6D is a cross-sectional view of the mold 101 for explaining a second stage of the method of molding the mesh filter 100 of the related art, and FIG. 6E is an enlarged view of a B4 portion of FIG. 6A.

Figures 6A, 6E:
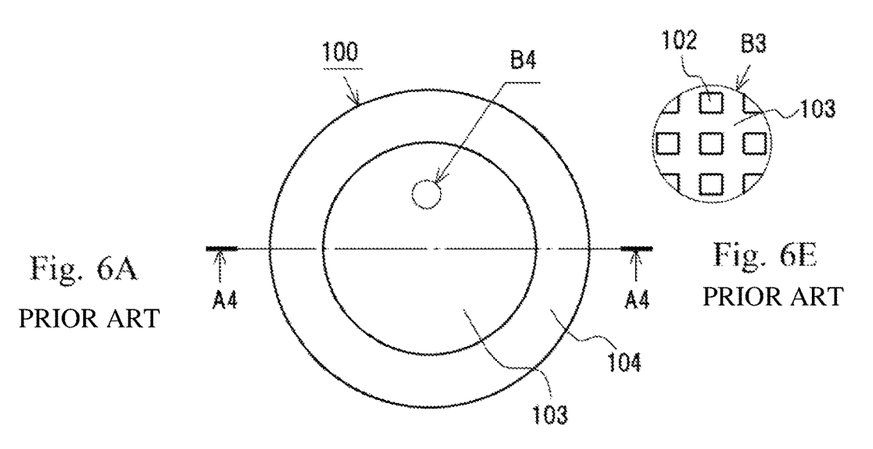
FIG. 6A is a plan view of the mesh filter of the related art.
FIG. 6E is an enlarged view of a portion B4 in FIG. 6A.
Figure 6B:
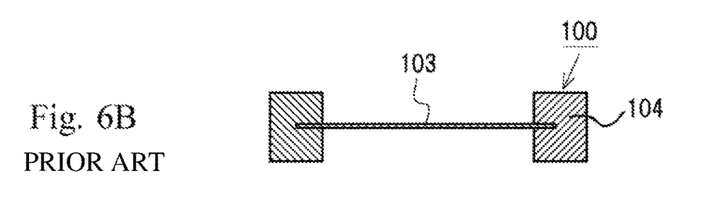
FIG. 6B is a cross-sectional view taken along line A4-A4 in FIG. 6A.

The mesh filter 100 of the related art illustrated in FIG. 6 includes a mesh member 103 having a number of openings 102 (for example, square openings of 0.1 mm×0.1 mm) configured to allow passage of oil and filter out foreign substances (metal powder, dust, and the like) having a predetermined size (for example, a diameter of 0.1 mm) and a resin-made frame member 104 mounted on the mesh member 103 along the peripheral edge thereof (see FIGS. 6A to 6B). The mesh filter 100 has a shape in which the mesh member 103 is stretched over the frame member 104 (see FIGS. 6A to 6B, 6E).

Figure 6C:
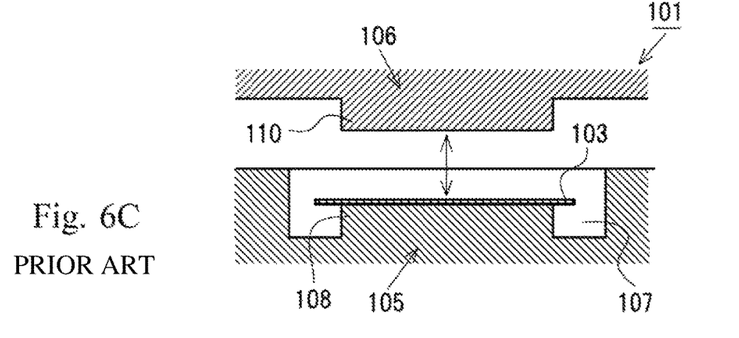
FIG. 6C is a cross-sectional view of a mold for explaining a first stage in a method of molding a mesh filter of the related art.
Figure 6D:
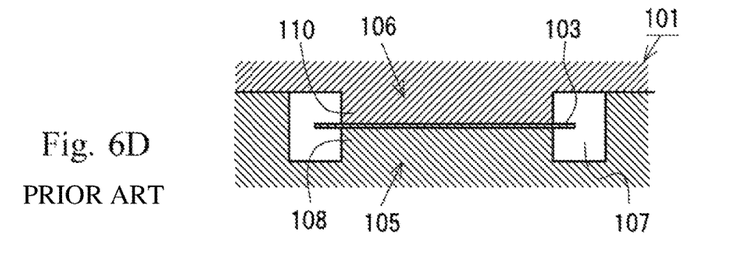
FIG. 6D is a cross-sectional view of a mold for explaining a second stage in a method of molding the mesh filter of the related art.

The mesh filter 100 configured in this manner of the related art is insert-molded as illustrated in FIGS. 6C to 6D. Firstly, in a state in which a first mold 105 and a second mold 106 are opened, the mesh member 103 is arranged on a base portion 108 in a cavity 107 of the first mold 105 (FIG. 6C). Subsequently, the second mold 106 is pressed against the first mold 105 (the first mold 105 and the second mold 106 are closed) and the mesh member 103 is pinched between a pressing portion 110 of the second mold 106 and the base portion 108 of the first mold 105, and the cavity 107 for forming the frame member 104 is formed on mating surface sides of the first mold 105 and the second mold 106. Subsequently, melted resin is injected from a gate, which is not illustrated, into the cavity 107 (see FIG. 6D), so that the resin-made frame member 104 is integrally molded on the peripheral edge of the mesh member 103 (see Patent Literatures 1, 2).

Because the mesh filter 100 of the related art as described above is manufactured by insert molding, the number of processes in manufacture is increased correspondingly to the number of processes required for installing the mesh member 103 in a predetermined position of the cavity 107 compared with a case where an entire part is integrally molded by injection molding. Therefore, an improvement of the productivity of the mesh filter and lowering of a price of the mesh filter as a product by integrally molding the entire mesh filter by the injection molding while maintaining filter performances (performances which can remove foreign substances having diameters equal to or larger than a predetermined particle diameter) of the mesh filter 100 of the related art have been demanded.

Accordingly, in order to respond to an industry's demand, it is an object of the present invention to provide an injection-molded mesh filter capable of improving productivity and lowering the price of the product while maintaining required filter performances.

SUMMARY OF THE INVENTION

As illustrated in FIG. 1A to FIG. 5B, a mesh filter 1 according to the present invention is configured to be capable of being mounted on a flow channel for filtering out foreign substances in a fluid. The mesh filter 1 according to the present invention includes an inner cylinder 2, an outer cylinder 3 configured to surround the inner cylinder 2, and a filter unit 4 configured to connect an outer peripheral surface 2a of the inner cylinder 2 and an inner peripheral surface 3a of the outer cylinder 3 along a radial direction of the inner cylinder 2. Assuming a virtual plane orthogonal to a center axis 5 of the inner cylinder 2 to be an X-Y plane, the filter unit 4 is formed along the X-Y plane. A portion of the filter unit 4 between the inner cylinder 2 and the outer cylinder 3 (not the connecting portion) is provided with a plurality of square-shaped openings 8 formed by a plurality of vertical ribs 6 formed equidistantly so as to be orthogonal to an X-axis and parallel to a Y-axis, and a plurality of lateral ribs 7 formed equidistantly so as to be orthogonal to the vertical ribs 6 and in parallel with the X-axis. Rib widths (L2, L3), which are dimensions between adjacent openings 8, 8, of the vertical ribs 6 and the lateral ribs 7 fall within a range from 0.07 mm to 0.1 mm, and thicknesses (L4, L5) thereof, which are dimensions in a direction along the center axis 5 of the inner cylinder 2, fall within a range from 0.2 mm to 0.4 mm. The mesh filter 1 of the present invention includes the inner cylinder 2, the outer cylinder 3, and the filter unit 4 molded integrally by injecting a thermoplastic resin in a melted state from a gate 18 opening at a cavity portion out of a cavity 13 of a mold 10 (a first cavity portion 14), which forms the inner cylinder 2, into the cavity portion. As such, the inner cylinder 2, the outer cylinder 3, and the filter unit 4 formed of the same resin material and have a one-piece construction.

Advantageous Effects of Invention

According to the present invention, the entire part of the mesh filter can be integrally molded by the injection molding as one piece, and thus an improvement of the productivity of the mesh filter and lowering of a price as a product of the mesh filter are achieved while maintaining filter performances of the mesh filter.

BRIEF DESCRIPTION OF THE DRAWINGS

FIGS. 1A-1G illustrate a mesh filter according to a first embodiment of the present invention, in which

FIGS. 2A-2E illustrate a mold used for injection molding of the mesh filter according to the first embodiment of the present invention, in which

FIGS. 3A-3G illustrate a mesh filter according to a second embodiment of the present invention, in which

FIGS. 6A-6D illustrate a mesh filter of the related art, in which

DETAILED DESCRIPTION OF THE INVENTION

Embodiments of the present invention will be described in detail below with reference to the drawings.

First Embodiment

Figure 1A:
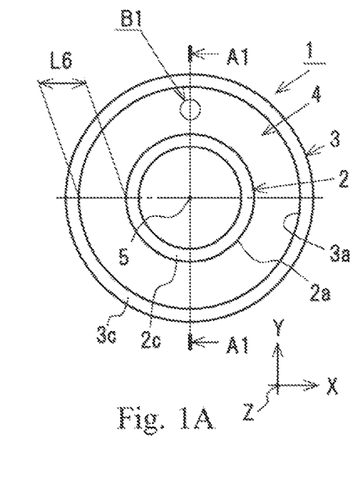
FIG. 1A is a front view of the mesh filter.
Figure 1B:
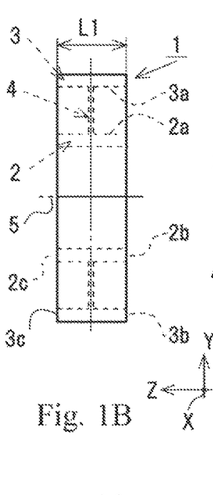
FIG. 1B is a side view of the mesh filter.
Figure 1C:
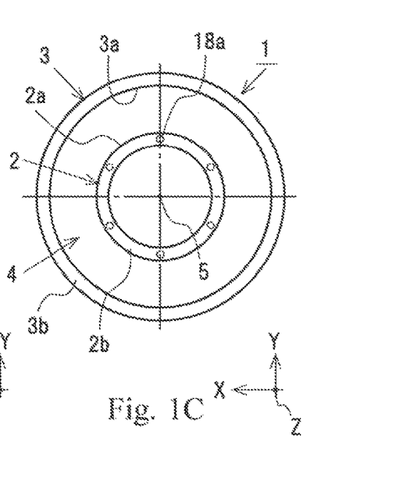
FIG. 1C is a back view of the mesh filter.
Figures 1D, 1E:
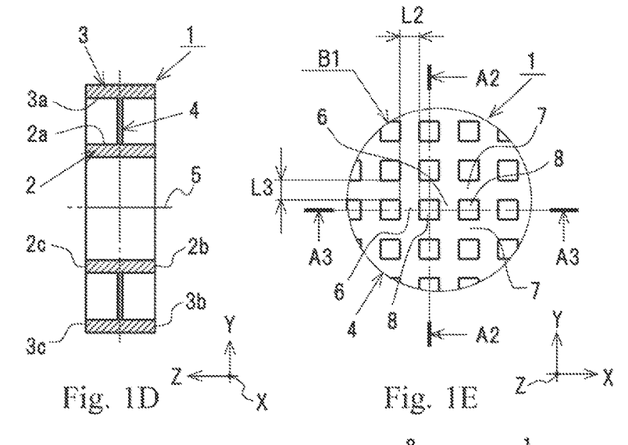
FIG. 1D is a cross-sectional view of the mesh filter taken along line A1-A1 in FIG. 1A.
FIG. 1E is an enlarged view of a portion B1 in FIG. 1A.
Figure 1F:
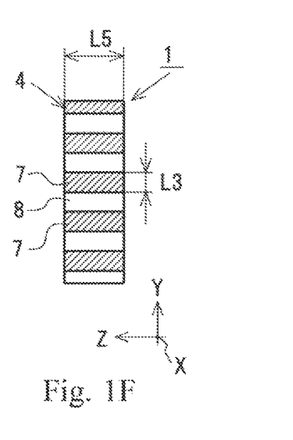
FIG. 1F is a cross-sectional view taken along line A2-A2 in FIG. 1E.
Figure 1G:
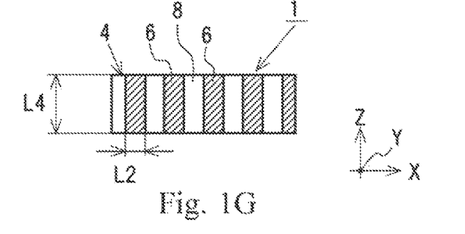
FIG. 1G is a cross-sectional view taken along line A3-A3 in FIG. 1E.

FIGS. 1A-1G illustrate a mesh filter 1 according to a first embodiment of the present invention. FIG. 1A is a front view of the mesh filter 1, FIG. 1B is a side view of the mesh filter 1, FIG. 1C is a back view of the mesh filter 1, and FIG. 1D is a cross-sectional view of the mesh filter 1 taken along line A1-A1 in FIG. 1A. FIG. 1E is an enlarged view of a portion B1 of FIG. 1A (an enlarged view of part of the mesh filter 1), FIG. 1F is a cross-sectional view taken along line A2-A2 in FIG. 1E (a partly enlarged cross-sectional view of the mesh filter 1), and FIG. 1G is a cross-sectional view taken along line A3-A3 in FIG. 1E (a partly enlarged cross-sectional view of the mesh filter 1).

As illustrated in FIGS. 1A-1G, the mesh filter 1 integrally includes a cylindrical inner cylinder 2 (inner frame member), a cylindrical outer cylinder 3 concentric with the inner cylinder 2 (outer frame member surrounding the inner frame member), and a filter unit 4 configured to connect an outer peripheral surface 2a of the inner cylinder 2 and an inner peripheral surface 3a of the outer cylinder 3 along a radial direction. This entire part of the mesh filter 1 is integrally formed of 66 nylon to have a one-piece construction. The mesh filter 1 as described above is configured to be arranged, for example, in the fuel supply tube which is connected to a fuel injection device of an automotive vehicle, in such a manner that the inner cylinder 2 and the outer cylinder 3 are mounted on a fuel supply conduit or the like via a seal member (not illustrated). The mesh filter 1 is used so as not to cause leakage of fuel (fluid) passing through the filter unit 4. In the present embodiment, an outer diameter of the inner cylinder 2 is 10 mm, and an outer diameter of the outer cylinder 3 is 16 mm. A thickness of the inner cylinder 2 is 1 mm, and a thickness of the outer cylinder 3 is 1 mm. Numerical values relating to the inner cylinder 2 and the outer cylinder 3 are examples only, and may be changed as needed depending on use conditions and the like.

The inner cylinder 2 and the outer cylinder 3 have the same lengthwise dimension L1 along a center axis 5, and both of one-end-surfaces 2b, 3b in a direction along the center axis 5 are located on the same virtual plane orthogonal to the center axis 5, and both of other-end-surfaces 2c, 3c in the direction along the center axis 5 are located on the same virtual plane orthogonal to the center axis 5. The relationship between the inner cylinder 2 and the outer cylinder 3 is not limited to that in the present embodiment, and may be configured to be deformed in association with a mounting state of the mesh filter 1 in such a manner that dimensions of the inner cylinder 2 and the outer cylinder 3 along the center axis 5 are different, or the one-end-surface 2b of the inner cylinder 2 in a direction along the center axis 5 is located at a position shifted from the one-end-surface 3b of the outer cylinder 3 in a direction along the center axis 5. A configuration in which the other-end-surface 2c of the inner cylinder 2 in a direction along the center axis 5 is located at a position shifted from the other-end-surface 3c of the outer cylinder 3 in a direction along the center axis 5 is also applicable.

Assuming a virtual plane orthogonal to a direction extending along the center axis 5 of the inner cylinder 2 to be an X-Y plane, the filter unit 4 is formed along the X-Y plane. As shown in FIG. 1E, a portion of the filter unit 4 between the inner cylinder 2 and the outer cylinder 3 (other than a connecting portion) is provided with a plurality of square-shaped openings 8 formed by a plurality of vertical ribs 6 formed equidistantly so as to be orthogonal to an X-axis and in parallel to a Y-axis, and a plurality of lateral ribs 7 formed equidistantly so as to be orthogonal to the vertical ribs 6 and parallel with the X-axis. The openings 8 are each formed into a regular tetragon, 0.1 mm on a side. The vertical ribs 6 and the lateral ribs 7 are configured in such a manner that rib widths (L2, L3), which correspond to a dimension of a portion between openings 8, 8 adjacent to each other (a dimension L2 in a direction along the X-axis in FIG. 1E or a dimension L3 in a direction extending along the Y-axis in FIG. 1E) are 0.1 mm, and thicknesses (L4, L5) of the vertical ribs 6 and the lateral ribs 7, which correspond to dimensions L4, L5 of the vertical ribs 6 and the lateral ribs 7 in a direction along the center axis 5 of the inner cylinder 2 (a Z-axis direction in FIG. 1F or a Z-axis direction in FIG. 1G) are 0.3 mm. The filter unit 4 is formed to have a radial dimension L6 along the X-axis direction falling within a range of 2 to 5 mm as illustrated in FIG. 1A, and an optimal dimension is set in accordance with a structure of a mounting portion of the mesh filter 1 and the like. The filter unit 4 also includes openings of regular tetragon, 0.1 mm on a side at a connecting portion between the inner cylinder 2 and the outer cylinder 3. The filter unit 4 is formed in such a manner that center portions in a direction along the center axis 5 of the inner cylinder 2 and the outer cylinder 3 are connected in the radial direction. However, the filter unit 4 is not limited thereto, and an arrangement on the inner cylinder 2 and the outer cylinder 3 at positions shifted to one-ends in a direction along the center axis 5, and an arrangement on the inner cylinder 2 and the outer cylinder 3 at positions shifted to the other-ends in a direction along the center axis 5 are also applicable.

Figure 2A:
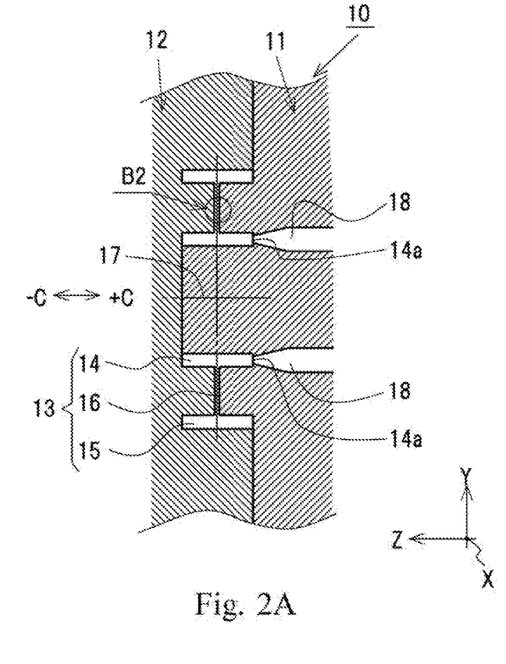
FIG. 2A is a vertical cross-sectional view of the mold.
Figure 2B:
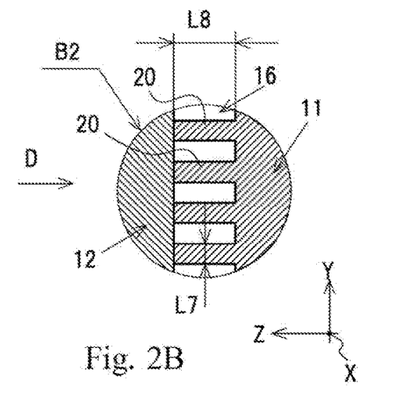
FIG. 2B is an enlarged view of a portion B2 in FIG. 2A.
Figure 2C:
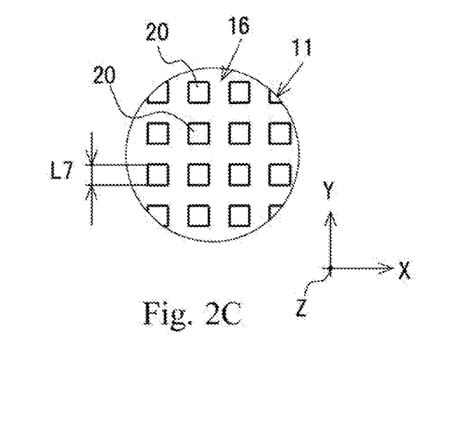
FIG. 2C is a plan view of part of a first mold viewed in a direction D in FIG. 2B.

FIGS. 2A-2E illustrate a mold 10 used for injection molding of the mesh filter 1 according to this embodiment. FIG. 2A is a vertical cross-sectional view of the mold 10, FIG. 2B is an enlarged view of a portion B2 in FIG. 2A (a partly enlarged cross-sectional view of the mold 10), and FIG. 2C is a plan view of part of a first mold 11 viewed in a direction D in FIG. 2B.

As illustrated in FIG. 2A, the mold 10 is provided with a cavity 13 for injection-molding the mesh filter 1 on mating surface sides of the first mold 11 and a second mold 12. The cavity 13 includes a cylindrical first cavity portion 14 for forming the inner cylinder 2 of the mesh filter 1, a cylindrical second cavity portion 15 for forming the outer cylinder 3 of the mesh filter 1, and a hollow disc-shaped third cavity portion 16 for forming the filter unit 4 of the mesh filter 1. The first mold 11 includes pin gates 18 opening on a one-end-surface 14a side in a direction along a center axis 17 of the first cavity portion 14 provided equidistantly at six positions along a circumferential direction of the first cavity portion 14 (see gate scars 18a in FIG. 1C). A portion forming the third cavity portion 16 of the first mold 11 includes a plurality of (the same number as the number of the openings 8) projections 20 for forming the openings 8 formed equidistantly thereon (see FIGS. 2B to 2C). The projections 20 formed on a portion that forms the third cavity portion 16 of the first mold 11 each have a regular tetragonal shape (the shape viewed in the direction D in FIG. 2B) in plan view, and are formed to have a dimension which can form the regular tetragonal openings 8 having a dimension L7 of 0.1 mm on a side. The projections 20 provided on a portion, which forms the third cavity portion 16 of the first mold 11, are formed so that the height thereof (a dimension L8 along the Z-axis direction of FIG. 2B) becomes a thickness (0.3 mm) of the vertical ribs 6 and the lateral ribs 7. In the present embodiment, a mode in which the pin gates 18 opening to the cavity 13 are provided equidistantly at six positions along the circumferential direction of the first cavity portion 14 has been exemplified. However, the pin gates 18 are not limited thereto, and may be provided at a plurality of, at least two positions in accordance with an outer diameter of the first cavity portion 14. Ring gates may be provided instead of a plurality of the pin gates 18.

With the mold 10 having the structure as described above, as illustrated in FIG. 2A, in a state in which the first mold 11 and the second mold 12 are closed, 66 nylon in a melted state is injected into the cavity 13 from the plurality of pin gates 18, then the pressure in the cavity 13 is maintained at a predetermined pressure, and then the mold 10 is cooled. Subsequently, the second mold 12 is separated (opened) from the first mold 11 in a −C direction, the mesh filter 1 in the cavity 13 is pushed out from the interior of the cavity 13 by an ejector pin, which is not illustrated, so that the mesh filter 1 with a one-piece construction, which corresponds to an injection molding product, is taken out from the mold 10 (see FIG. 1A). Subsequently, the second mold 12 of the mold 10 in an opened state is moved in a +C direction (a direction approaching the first mold 11), the second mold 12 is pressed against the first mold 11, and the first mold 11 and the second mold 12 are closed. One cycle of the injection molding of the mesh filter 1 according to the present embodiment as described above is shorter than one cycle of an insert molding of the mesh filter 100 of the related art. Consequently, with the mesh filter 1 of the present embodiment, productivity is improved more than the mesh filter 100 of the related art, and a product price is lower than that of the mesh filter 100 of the related art.

Figure 2D:
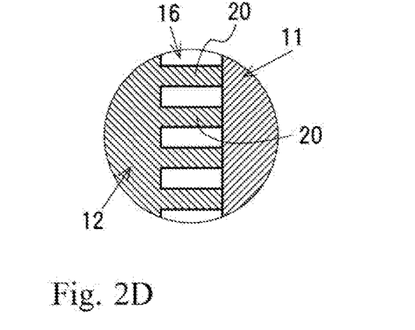
FIG. 2D is a drawing illustrating a first modification of projections that form openings (a drawing corresponding to FIG. 2B)

FIG. 2D is a drawing illustrating a first modification of the projections 20 for forming the openings 8. As illustrated in FIG. 2D, the projections 20 for forming the openings 8 may be formed only on a portion which forms the third cavity portion 16 of the second mold 12 instead of forming on a portion which forms the third cavity portion 16 of the first mold 11.

Figure 2E:
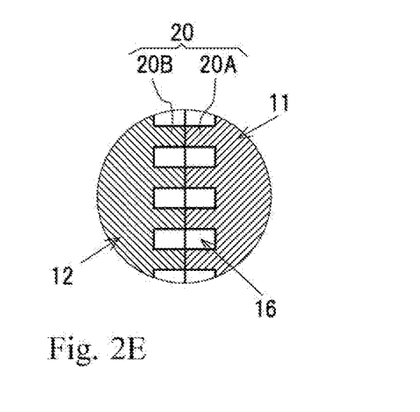
FIG. 2E is a drawing illustrating a second modification of projections that form openings (a drawing corresponding to FIG. 2B).
Figures 3A, 3B:
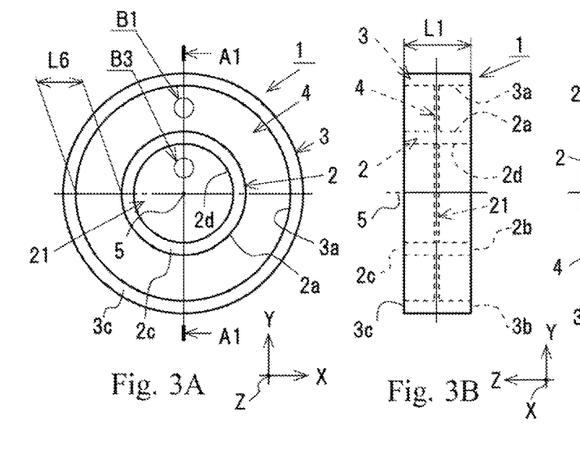
FIG. 3A is a front view of the mesh filter.
FIG. 3B is a side view of the mesh filter.
Figure 3C:
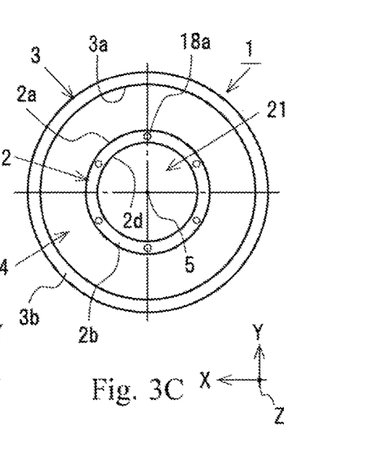
FIG. 3C is a back view of the mesh filter.
Figure 3D:
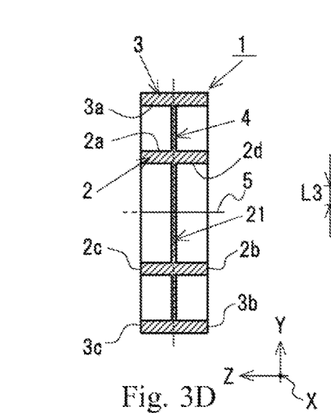
FIG. 3D is a cross-sectional view of the mesh filter taken along line A1-A1 in FIG. 3A.
Figure 3E:
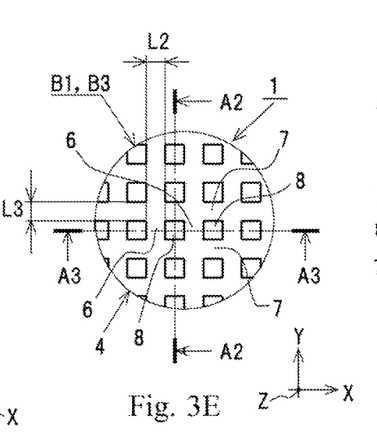
FIG. 3E is an enlarged view of a portion B1 in FIG. 3A.
Figure 3F:
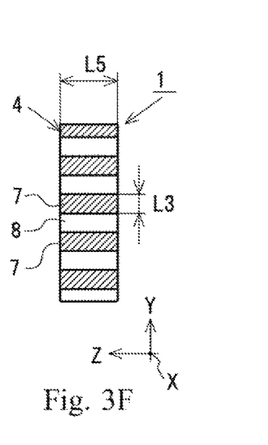
FIG. 3F is a cross-sectional view taken along line A2-A2 in FIG. 3E.
Figure 3G:
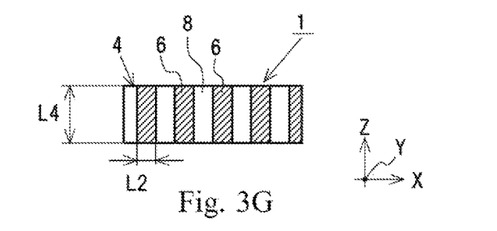
FIG. 3G is a cross-sectional view taken along line A3-A3 in FIG. 3E.

FIG. 2E is a drawing illustrating a second modification of the projections 20 for forming the openings 8. As illustrated in FIG. 2E, the projections 20 for forming the openings 8 may be formed separately on the portion which forms the third cavity portion 16 of the first mold 11 and on the portion which forms the third cavity portion 16 of the second mold 12. In the second modification, the height of each of the projections 20A, 20B of the first mold 11 and the second mold 12 is formed to have ½ the height of the projections 20 in the above-described embodiment and the above-described first modification. At the time of closing the first mold 11 and the second mold 12, top surfaces of the projections 20A and top surfaces of the projections 20B are butted with each other.

In the interior of the cavity 13 of the mold 10 configured as described above, 66 nylon (CM3001-N of Toray Industries, INC.) in a melted state is injected, so that the mesh filter 1 having the same shape as the shape of the cavity 13 is molded. An injection molding machine (not illustrated) used in the injection molding of the mesh filter 1 is an injection molding machine (S2000i 50B) manufactured by FANUC CORPORATION. The injection molding machine described above has a screw size of φ28, and a maximum injection pressure of 190 MPa.

The injection molding of the mesh filter 1 according to the present embodiment using the injection molding machine was performed with the mold 10 at a temperature of 80° C., a cylinder temperature (nozzle portion temperature) of 300° C., an injection speed of 140 mm/sec, and an injection pressure of 124 MPa.

With the mesh filter 1 of the present embodiment as described above, the mold 10 described above and the injection molding machine described above are used, and 66 nylon in the melted state is injection molded under the injection molding conditions described above, so that the entire part (the inner cylinder 2, the outer cylinder 3, and the filter unit 4) is injection-molded integrally and at a high degree of accuracy without causing molding failures such as a short shot and the like. Thus, productivity is improved and the product price is lowered in a state in which performances as a filter is maintained compared with the insert molding of the related art.

Since the mesh filter 1 of the present embodiment includes the plurality of openings 8 of the filter unit 4 having the same dimension (regular tetragon, 0.1 mm on a side), for example, by being arranged in the fuel supply conduit connected to the fuel injection device of the automotive vehicle, foreign substances in a fuel having a diameter exceeding 0.1 mm can be filtered out, and the fuel from which the foreign substances are removed can flow out smoothly from the openings 8. With the mesh filter in which the surface areas of the openings are not formed to be the same over the entire area of the filter unit, the lowest values of the particle diameter of the foreign substances that can be filtered out by the filter unit may vary. Hence, foreign substances which need to pass through the filter unit may be filtered out, or foreign substances which need to be filtered out by the filter unit may be passed therethrough, so that insufficient filtering performances may result. However, with the mesh filter 1 of the present embodiment, the lowest values of the particle diameter of foreign substances that can be filtered out do not vary, so that the filter performances can be improved more than the case where the surface areas of the openings vary.

With the mesh filter 1 of the present embodiment, since the thicknesses (L4, L5) of the vertical ribs 6 and the lateral ribs 7 are the same (0.3 mm) over the entire area of the filter unit 4, for example, machining of the mold 10 is easier than the case where at least one of the thicknesses of the vertical ribs 6 and the lateral ribs 7 at a center portion of the filter unit 4 is formed to be the thickness of at least the one of the vertical ribs 6 and the lateral ribs 7 in other portions of the filter unit 4, and the cost of the mold 10 is lowered, and thus the price as a product can be lowered.

With the mesh filter 1 of the present embodiment, since the thicknesses (L4, L5) of the vertical ribs 6 and the lateral ribs 7 are three times larger than the rib widths (L2, L3) of the vertical ribs 6 and the lateral ribs 7, rigidity of the filter unit 4 can be enhanced. Accordingly, with the mesh filter 1 of the present embodiment, separating property with respect to the mold is desirable, and also accuracy in shape of the filter unit 4 of the molded product can be enhanced.

Modification of the First Embodiment

In the mesh filter 1 of the first embodiment described above, 66 nylon, which corresponds to a thermoplastic resin, is used as the material for injection molding. However, the material is not limited thereto, and POM (polyacetal, for example, M450-44), which is a thermoplastic resin, can be used.

In the case where the mesh filter 1 was injection-molded by using the POM, when the rib widths (L2, L3) of the vertical ribs 6 and the lateral ribs 7 were 0.1 mm and the thicknesses (L4, L5) of the vertical ribs 6 and the lateral ribs 7 were 0.2 mm, the same mesh filter 1 as that of the first embodiment described above could be molded. In addition, when the rib widths (L2, L3) of the vertical ribs 6 and the lateral ribs 7 were 0.07 mm and the thicknesses (L4, L5) of the vertical ribs 6 and the lateral ribs 7 were 0.4 mm, the same mesh filter 1 as that of the first embodiment described above could be molded.

Second Embodiment

FIGS. 3A-3G illustrate a mesh filter 1 according to a second embodiment of the present invention. The same parts of the mesh filter 1 of the present (second) embodiment as the mesh filter 1 of the first embodiment are denoted by the same reference numerals, and descriptions overlapped with the descriptions of the mesh filter 1 of the first embodiment will be omitted.

The mesh filter 1 of the present embodiment includes a center-side filter unit 21 formed on a radially inside the inner cylinder 2 from the center axis 5 of the inner cylinder 2 to an inner peripheral surface 2d of the inner cylinder 2. The center-side filter unit 21 is formed in the same manner as the filter unit 4 of the mesh filter 1 of the first embodiment described above (see FIG. 1E and FIG. 3E). According to the mesh filter 1 of the present embodiment, in the case where the particle diameter of foreign substances which are to be filtered out by the center-side filter unit 21 and the particle diameter of foreign substances which are to be filtered out by the filter unit 4 are different from each other, an opening surface area of the openings 8 of the center-side filter unit 21 may be differentiated from that of the openings 8 of the filter unit 4 in accordance with the particle diameter of the foreign substances which are to be filtered out.

Figure 4:
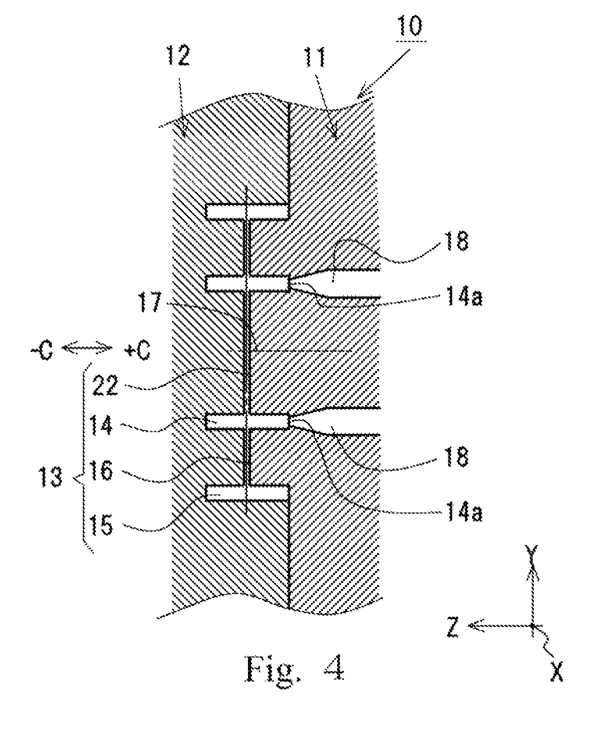
FIG. 4 is a cross-sectional view illustrating a mold used for injection molding of the mesh filter according to the second embodiment of the present invention, corresponding to FIG. 2A.

FIG. 4 illustrates a mold 10 used for injection molding of the mesh filter 1 according to the present (second) embodiment, and is a cross-sectional view corresponding to FIG. 2A. The same parts of the mold 10 illustrated in FIG. 4 as the mold 10 in FIGS. 2A-2E are denoted by the same reference signs, and descriptions overlapped with that of the mold 10 in FIGS. 2A-2E will be omitted.

The mold 10 illustrated in FIG. 4 includes a fourth cavity portion 22 for forming the center-side filter unit 21 radially inside the first cavity portion 14 for forming the inner cylinder 2.

According to the mold 10 of the present embodiment described above, when the thermoplastic resin in the melted state is injected from the pin gates 18 opening to the first cavity portion 14, the thermoplastic resin in the melted state flows from the first cavity portion 14 toward the third cavity portion 16 and the fourth cavity portion 22, and the entire part (the inner cylinder 2, the outer cylinder 3, the filter unit 4, and the center-side filter unit 21) is injection-molded integrally with high-degree of accuracy.

Third Embodiment

Figure 5A:
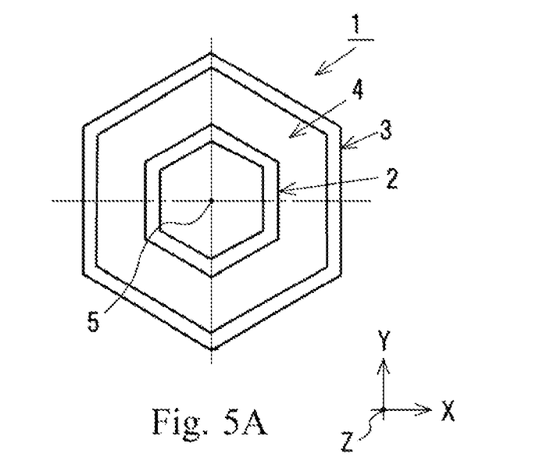
FIGS. 5A and 5B illustrate a mesh filter according to a third embodiment of the present invention (drawings corresponding to FIG. 1A and FIG. 3A), and illustrate a modification of the mesh filters according to the first and the second embodiments.
Figure 5B:
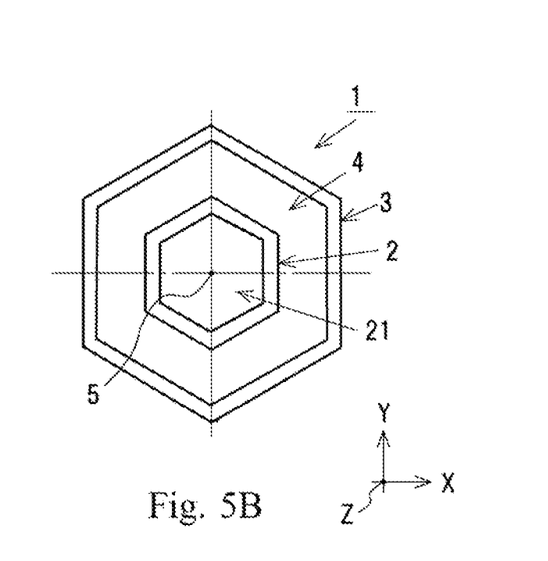

FIGS. 5A and 5B illustrate a mesh filter 1 according to a third embodiment of the present invention (drawings corresponding to FIG. 1A and FIG. 3A), and illustrate a modification of the mesh filters 1 according to the first and the second embodiments. FIG. 5A is a drawing illustrating a modification of the mesh filter 1 of the first embodiment, and FIG. 5B is a drawing illustrating a modification of the mesh filter 1 according to the second embodiment.

As illustrated in FIG. 5A, shapes of the inner cylinder 2 and the outer cylinder 3 of the mesh filter 1 on the front side are formed into a regular hexagon. In this manner, the shapes of the inner cylinder 2 and the outer cylinder 3 of the mesh filter 1 may be formed corresponding to the shapes of counterpart members (fuel conduit and the like) to be mounted thereto as long as leakage of fuel is prevented. The mesh filter 1 may be injection-molded, and shapes of the inner cylinder 2 and the outer cylinder 3 on the front side may be formed into polygonal shapes other than a regular pentagon as long as functions as the mesh filter are exhibited. The shapes of the inner cylinder 2 and the outer cylinder 3 may be different in such a manner that the shape of the inner cylinder 2 on the front side is a circle and the front shape of the outer cylinder 3 is a regular octagon.

Although the mesh filter 1 of the present embodiment is exemplified in a mode of being installed in the fuel supply tube which is to be connected to the fuel injection device of the automotive vehicle, the mesh filter 1 may be installed at a midpoint of an oil conduit such as a lubricating device or the like of the automotive vehicle as a matter of course. Alternatively, the mesh filter 1 is not limited thereto and may be installed in a conduit such as a water supply tube or a wind supply tube and used in a technical field of a wide range for removing foreign substances mixed in fluid (liquid such as water and gas such as air and the like).

REFERENCE SIGNS LIST

1 . . . mesh filter, 2 . . . inner cylinder, 2a . . . outer surface, 2b . . . one-end-surface, 3 . . . outer cylinder, 3a . . . inner surface, 4 . . . filter unit, 5 . . . center axis, 6 . . . vertical rib, 7 . . . lateral rib, 8 . . . opening, 10 . . . mold, 13 . . . cavity, 18 . . . pin gate, L2, L3 . . . rib width, L4 . . . thickness of vertical rib, L5 . . . thickness of lateral rib

The invention claimed is:

1. A mesh filter used for filtering out foreign substances in fluid, said mesh filter comprising:
   an inner cylinder having a hollow interior space;
   an outer cylinder surrounding the inner cylinder; and
   a filter unit completely surrounding the inner cylinder and having a uniform thickness, the filter unit being integrally-molded to the inner cylinder and the outer cylinder to connect an outer peripheral surface of the inner cylinder and an inner peripheral surface of the outer cylinder along a radial direction of the inner cylinder,
   wherein, assuming a virtual plane orthogonal to a center axis of the inner cylinder to be an X-Y plane, the filter unit is formed along the X-Y plane,
   wherein the filter unit has a plurality of square-shaped openings between the inner cylinder and the outer cylinder, the openings being formed by a plurality of vertical ribs formed equidistantly so as to be orthogonal to an X-axis and parallel to a Y-axis, and a plurality of lateral ribs formed equidistantly so as to be orthogonal to the vertical ribs and parallel with the X-axis,
   wherein rib widths are defined as dimensions between adjacent openings of the vertical ribs and the lateral ribs, and the rib widths fall within a range from 0.07 mm to 0.1 mm,
   wherein thicknesses are defined as dimensions in a direction along the center axis of the inner cylinder, and the thicknesses of the filter unit fall within a range from 0.2 mm to 0.4 mm,
   wherein the inner cylinder, the outer cylinder, and the filter unit form an integral, molded unit formed of an identical type of thermoplastic resin so as to have a one-piece construction; and
   wherein the inner cylinder and the outer cylinder have an identical axial length in a direction along a center axis of the inner cylinder.

2. The mesh filter according to claim 1, further comprising a center-side filter unit extending from a center axis of the inner cylinder to an inner peripheral surface of the inner cylinder,
   wherein, assuming a virtual plane orthogonal to the center axis of the inner cylinder to be an X-Y plane, the center-side filter unit is formed along the X-Y plane,
   wherein a portion of the center-side filter unit with respect to the inner cylinder is provided with a plurality of square-shaped openings formed by a plurality of vertical ribs formed equidistantly so as to be orthogonal to an X-axis and parallel to a Y-axis, and a plurality of lateral ribs formed equidistantly so as to be orthogonal to the vertical ribs and parallel with the X-axis,
   wherein center-side rib widths are defined as dimensions between adjacent openings of the vertical ribs and the lateral ribs, and the center-side rib widths fall within a range from 0.07 mm to 0.1 mm,
   wherein thicknesses are defined as dimensions in a direction along the center axis of the inner cylinder, and the thicknesses of the center-side filter unit fall within a range from 0.2 mm to 0.4 mm, and
   wherein the inner cylinder, the outer cylinder, the filter unit, and the center-side filter unit form an integral, molded unit formed of an identical type of thermoplastic resin so as to have a one-piece construction.

3. The mesh filter according to claim 2, wherein the center-side filter unit is connected to the inner peripheral surface of the inner cylinder at an axial center position of the inner cylinder relative to the center axis of the inner cylinder.

4. The mesh filter according to claim 1, wherein each of the inner cylinder and the outer cylinder has a first axial end having a first-axial-end surface, the first-axial-end surface of the inner cylinder and the first-axial-end surface of the outer cylinder both being located within a first plane orthogonal to the center axis of the inner cylinder; and
   wherein each of the inner cylinder and the outer cylinder has a second axial end opposite the first axial end and having a second-axial-end surface, the second-axial-end surface of the inner cylinder and the second-axial-end surface of the outer cylinder both being located within a second plane orthogonal to the center axis of the inner cylinder.

5. The mesh filter according to claim 4, wherein the filter unit is connected to the outer peripheral surface of the inner cylinder at an axial center position of the inner cylinder relative to the center axis of the inner cylinder, and the filter unit is connected to the inner peripheral surface of the outer cylinder at an axial center position of the outer cylinder relative to a center axis of the outer cylinder.

6. The mesh filter according to claim 1, wherein the filter unit is connected to the outer peripheral surface of the inner cylinder at an axial center position of the inner cylinder relative to the center axis of the inner cylinder, and the filter unit is connected to the inner peripheral surface of the outer cylinder at an axial center position of the outer cylinder relative to a center axis of the outer cylinder.

7. A mesh filter used for filtering out foreign substances in fluid, said mesh filter comprising:
   a cylindrical inner cylinder having a hollow interior space;
   a cylindrical outer cylinder concentric with the inner cylinder; and
   a filter unit completely surrounding the inner cylinder and having a uniform thickness, the filter unit being integrally-molded to the inner cylinder and the outer cylinder to connect an outer peripheral surface of the inner cylinder and an inner peripheral surface of the outer cylinder along a radial direction of the inner cylinder,
   wherein, assuming a virtual plane orthogonal to a center axis of the inner cylinder to be an X-Y plane, the filter unit is formed along the X-Y plane,
   wherein the filter unit has a plurality of square-shaped openings between the inner cylinder and the outer cylinder, the openings being formed by a plurality of vertical ribs formed equidistantly so as to be orthogonal to an X-axis and parallel to a Y-axis, and a plurality of lateral ribs formed equidistantly so as to be orthogonal to the vertical ribs and parallel with the X-axis,
   wherein each of the openings has a regular tetragon shape, with a length of 0.1 mm on each side,
   wherein rib widths are defined as dimensions between adjacent openings of the vertical ribs and the lateral ribs and are 0.1 mm,
   wherein thicknesses are defined as dimensions in a direction along the center axis of the inner cylinder, and the thicknesses of the filter unit are 0.3 mm,
   wherein the inner cylinder, the outer cylinder, and the filter unit form an integral, molded unit formed of 66 nylon material so as to have a one-piece construction; and wherein the inner cylinder and the outer cylinder have an identical axial length in the direction along the center axis of the inner cylinder.

8. The mesh filter according to claim 7, wherein each of the inner cylinder and the outer cylinder has a first axial end having a first-axial-end surface, the first-axial-end surface of the inner cylinder and the first-axial-end surface of the outer ring cylinder both being located within a first plane orthogonal to the center axis of the inner cylinder; and wherein each of the inner cylinder and the outer cylinder has a second axial end opposite the first axial end and having a second-axial-end surface, the second-axial-end surface of the inner cylinder and the second-axial-end surface of the outer cylinder both being located within a second plane orthogonal to the center axis of the inner cylinder.

9. The mesh filter according to claim 8, wherein the filter unit is connected to the outer peripheral surface of the inner cylinder at an axial center position of the inner cylinder relative to the center axis of the inner cylinder, and the filter unit is connected to the inner peripheral surface of the outer cylinder at an axial center position of the outer cylinder relative to a center axis of the outer cylinder.

10. The mesh filter according to claim 7, wherein the filter unit is connected to the outer peripheral surface of the inner cylinder at an axial center position of the inner cylinder relative to the center axis of the inner cylinder, and the filter unit is connected to the inner peripheral surface of the outer cylinder at an axial center position of the outer cylinder relative to a center axis of the outer cylinder.

\* \* \* \* \*